May 4, 1948.　　　　　C. D. WEST　　　　　2,441,049
COMPOSITE ACHROMATIC WAVE PLATES COMPRISING SUPERIMPOSED SHEETS
OF DIFFERENTLY BIREFRINGENT, MOLECULARLY ORIENTED,
TRANSPARENT, SOLID, ORGANIC PLASTIC MATERIAL
Filed Sept. 29, 1944　　　　2 Sheets-Sheet 1

INVENTOR.
Cutler D. West
BY Donald L. Brown
Attorney

FIG. 3

Patented May 4, 1948

2,441,049

UNITED STATES PATENT OFFICE 2,441,049

COMPOSITE ACHROMATIC WAVE PLATES COMPRISING SUPERIMPOSED SHEETS OF DIFFERENTLY BIREFRINGENT, MOLECULARLY ORIENTED, TRANSPARENT, SOLID, ORGANIC PLASTIC MATERIAL

Cutler D. West, Cambridge, Mass., assignor to Polaroid Corporation, Cambridge, Mass., a corporation of Delaware Application September 29, 1944, Serial No. 556,336

17 Claims. (Cl. 88—65)

This invention relates to the production of birefringent material, and more particularly to birefringent material of predetermined characteristics of birefringence, primarily from the standpoint of the chromatic dispersion of birefringence.

It is one object of the present invention to provide birefringent sheet material having a predetermined phase difference for any desired wavelength or band of wavelengths, and a predetermined dispersion of phase difference over any desired wavelength band up to and including the entire visible spectrum.

Another object is to provide birefringent material having the above properties and composed of sheet plastic material, and particularly to provide such material in the form of a composite sheet comprising two or more birefringent plastic sheets, so chosen and combined with respect to their phase differences and dispersions thereof as to give the desired properties in the composite sheet.

A further object is to provide birefringent material of the above class wherein the phase difference will be substantially uniform over a predetermined wavelength band and which material will accordingly be achromatic for substantially all light rays within said wavelength band.

A still further object is to provide a composite birefringent plastic sheet which will be achromatic throughout the entire visible spectrum for any desired predetermined degree of retardation.

A still further object is to provide new and improved sensitive tint plate material comprising birefringent plastic material of the above indicated class, which will be positively berefringent for light in one region of the spectrum, negatively birefringent for light in another region of the spectrum and substantially isotropic for light intermediate said first-named spectral regions, and particularly to provide such material wherein said isotropic spectral region is at any desired predetermined wavelength.

Additional objects and advantages will in part appear and in part be pointed out in the course of the following detailed description of one or more embodiments of the invention, which are given as non-limiting examples, in connection with the accompanying drawings in which:

The study of birefringence in light transmitting materials has received considerable attention in the past, but in general this study has been directed towards properties of natural birefringent materials such particularly as crystals. There has also been some study of birefringence in plastic materials, but in general it has been concerned with properties of birefringence as natural phenomena and not with the control of such properties or more particularly the uses to which materials possessing such properties could be put. The very substantial development in recent years of the production and use of light polarizing plastic materials has produced a substantial demand for birefringent plastic materials of predetermined birefringence, particularly from the standpoint of spectral dispersion. There is a substantial demand for use in polarized light of birefringent material in which the retardation of the ordinary ray with respect to the extraordinary ray will be substantially uniform throughout the visible spectrum, and which therefore will be substantially achromatic in polarized light. For example, such material capable of producing acromatic retardation of a quarter-wave is particularly adapted for use in the production of polarizing light having a substantially circular vibration state over the entire spectral band for which said material is achromatic. It is with this general subject that the present invention is primarily concerned.

Most readily obtainable plastic materials such as the cellulose esters, vinyl compounds such as polyvinyl alcohol, and the like possess appreciable birefringence, the degree of birefringence depending upon the degree of molecular orientation therein. The spectral dispersion (N) of birefringence for light transmitting materials generally may be expressed by the equation $$N = \frac{\Gamma(D)}{\Gamma(F) - \Gamma(C)} \qquad (1)$$

wherein $\Gamma(D)$ is the retardation or path difference between the ordinary and extraordinary ray, measured in units of length, of a given birefringent material of a given thickness for the sodium or D line of the spectrum, and $\Gamma(F)$ and $\Gamma(C)$ represent similar values for the F and C lines of the spectrum, respectively. In the application of the invention the following relations will also be found useful:

$$\Gamma = \delta \lambda / 2\pi = \Delta n(\lambda) t \qquad (2)$$

wherein thickness ($t$) and wavelength ($\lambda$) are expressed in the same units as $\Gamma$ and $\Delta n(\lambda)$ is the difference between the refractive indices for a given wavelength, and $\delta$ is the phase difference in degrees between the ordinary and extraordinary rays.

For most birefringent materials $\Gamma$ is substantially constant throughout the visible spectrum and N is relatively large, its absolute value ranging from the order of 20 to infinity. Furthermore, it will be seen from Equation 2 that when $\Gamma$ is constant $\delta$ varies with wavelength, and it is this condition which gives rise to interference colors in polarized light. One aspect of the present invention is concerned with the production of birefringent material wherein $\Gamma$ is not constant but preferably varies in such manner as to be substantially directly proportional to wavelength either over a predetermined wavelength band or over the entire visible spectrum, in which case it will be seen that $\delta$ will be constant with wavelength. This will be the condition for achromatic retardation and the corresponding value for N may be readily derived from Equations 1 and 2 as follows:

$$N = \frac{\delta \lambda(D)/2\pi}{\delta \lambda(F)/2\pi - \delta \lambda(C)/2\pi} \qquad (3)$$

but since the N for achromatism is the N for constant $\delta$, the constant term $\delta/2\pi$ cancels out, and $$N = \frac{\lambda(D)}{\lambda(F) - \lambda(C)} = \frac{589}{486 - 656} = \frac{589}{-170} = -3.46 \qquad (4)$$

Figure 1:
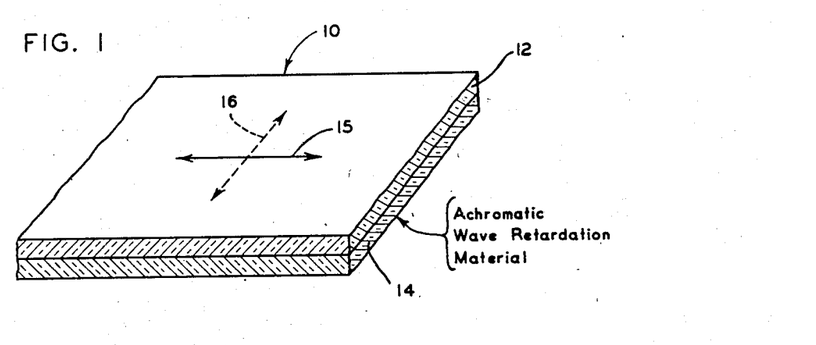
Figure 1 is a diagrammatic view illustrating achromatic plastic wave retardation material embodying a form of the invention.

As already pointed out, the normal condition for readily obtainable birefringent materials is to have N at least of the order of 20 or substantially larger. In accordance with the present invention, however, it has been found that a birefringent sheet of the desired achromatic properties may be achieved by combining two or more different sheets of different birefringence, so chosen and combined that the phase differences in each component sheet will add to a substantially constant sum throughout any desired wavelength band up to and including the entire visible spectrum. Such a composite sheet 10 is illustrated diagrammatically in Fig. 1 as comprising a pair of superimposed component sheets 12 and 14, which will preferably be bonded together in any suitable way. It will be apparent that in choosing specific material suitable for use in such combination, it will be desirable to know the N, $\Gamma$ and $\delta$ values in the individual sheets, and in accordance with the present invention there are provided novel apparatus and methods for readily determining said values.

Figure 2:
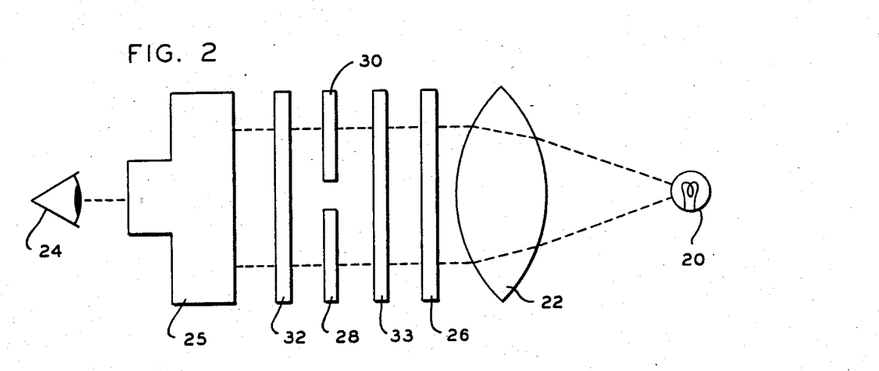
Figure 2 is a diagrammatic view illustrating apparatus for measuring birefringence of organic plastic sheets for use in accordance with the invention.

It is apparent from Equation 2 that for a birefringent sheet of given thickness any one of the above values may be readily computed from any one of the others. Fig. 2 illustrates diagrammatically the apparatus and method of the invention for measuring phase difference ($\delta$) for any desired wavelength or wavelengths in material of unknown birefringence. Light from any suitable collimated beam source such as bulb 20 and collimating lens 22 ultimately reaches the eye 24 of the observer through the exit pupil of any suitable monochromator 25, such for example as a rotatably mounted prism. Element 26 represents a light polarizing element transmitting plane polarized light and which may, for example, comprise any of the sheet polarizing elements sold commercially. Elements 28 and 30 represent two other linear polarizing elements having their respective polarizing axes at right angles to each other and either exactly parallel or perpendicular to the polarizing axis of polarizer 26. Said elements may be of the same type as polarizer 26 or may comprise a Wollaston prism or similar device. Element 32 represents a rotatable polarizing element provided with any suitable scale means for indicating its degree of rotation with respect to polarizers 28 and 30. For example, said scale may conveniently read 0° when polarizer 32 is crossed with polarizer 30, 90° when polarizer 32 is crossed with polarizer 28, and 45° when the two fields are balanced. Element 33 represents a sheet of birefringent material of unknown birefringence.

In employing the apparatus shown in Fig. 2, analyzer 32 may be set to the 0° position, and birefringent sheet 33 then turned exactly 45° from its extinction position between polarizer 26 and polarizers 28 and 30. In other words, sheet 33 will first be set so that the vibration directions therein are substantially parallel and perpendicular to the axes of polarizers 26, 28 and 30 and then rotated exactly 45° in either direction from that position along the axis of lens 22. With the system in this position the light transmitted by element 33 will be elliptically polarized with the major axis ($a$) of the ellipse parallel to the axis of one of polarizers 28 and 30, for example polarizer 30, and the minor axis ($b$) parallel to the axis of polarizer 28. The intensity of the light transmitted under these conditions by polarizers 28 and 30 will therefore be $b^2$ and $a^2$ respectively. If analyzer 32 is then rotated through an angle ($\alpha$) which balances the two fields defined by polarizers 28 and 30, the intensity ratio may be expressed by $$\tan^2 \alpha = \frac{b^2}{a^2} \qquad (5)$$

and this in turn provides the simple expressions $$\tan \alpha = \frac{b}{a} \qquad (6)$$

and $$2\alpha = \delta \qquad (7)$$

To state this last expression in words, the azimuth angle of analyzer 32 in the balanced position is equal to one-half the phase difference between the ordinary and extraordinary rays in birefringent element 33.

Figure 3:
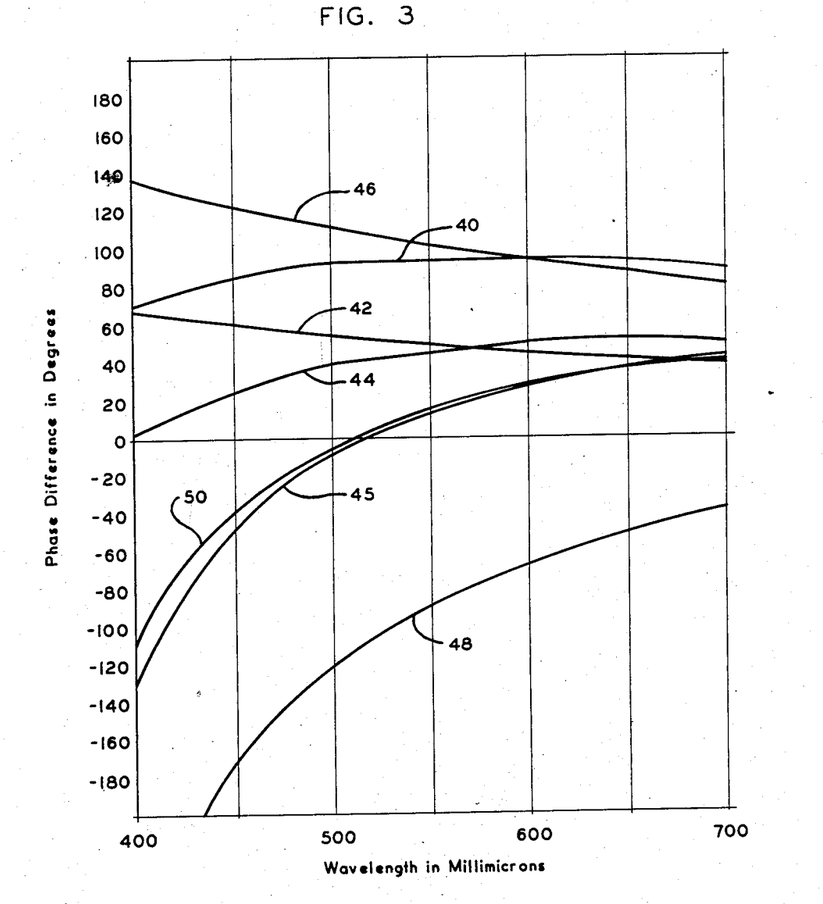
Figure 3 is a graph illustrating certain optical properties of materials embodying one or more forms of the invention.

It will be seen that with the apparatus shown in Fig. 2 it is a relatively simple matter to measure the phase difference in birefringent element 33 at every wavelength. It will also be found advantageous to reduce the resulting values to graph form as shown in Fig. 3, which includes dispersion curves of $\delta$ from 400–720 m$\mu$ for a variety of birefringent materials produced in accordance with the present invention. When birefringent sheet materials are combined in the manner shown in Fig. 1, their phase differences combine by simple addition—of positive values when the sheets have their vibration directions parallel and of positive and negative values when the vibration directions are crossed. A composite sheet of the desired achromatic properties may therefore be produced by combining two different sheets whose individual δ curves are substantially opposite and will accordingly add to the desired constant at substantially all wavelengths.

In Fig. 3, curve 40 represents the dispersion of δ of a composite birefringent sheet 10 constructed in accordance with the present invention to give substantially achromatic quarter-wave retardation. Curves 42 and 44 represent the δ dispersion of component sheets 12 and 14 which will combine to produce δ curve 40. In this embodiment of the invention the sheet 12 represented by curve 42 may comprise a cellulose acetate sheet approximately 0.015 inch in thickness and having its molecules oriented in the direction indicated by arrow 15 in Fig. 1 to such an extent that the sheet is biaxial, with the angle between the axes within the sheet being of the order of 42°. The sheet 14 represented by curve 44 in this case may comprise a cellulose nitrate sheet which has been stretched to substantially 1.5 times its original length in the isotropic state and of a final thickness of approximately 0.0033 inch. Since both of curves 42 and 44 represent positive δ values which add to the desired sum, it will be understood that in this example sheets 12 and 14 should be superimposed with their respective vibration directions parallel, i. e., with their respective directions of stretch parallel as indicated by arrow 15 in Fig. 1.

It will be understood that the δ curve for a theoretically perfect quarter-wave plate will be a straight line at 90°, and it will be noted that curve 40 compares very favorably with such a curve, the average value of δ of the entire illustrated spectral region being only slightly more than 90°. These conclusions with respect to achromatism are also supported by translating curve 40 into terms of N in accordance with Equations 1 and 2, as follows:

$$N = \frac{93.2 \ (589)}{90.3 \ (486) - 91.6 \ (656)} = -3.73 \qquad (8)$$

which approximates very closely the −3.46 value of N for achromatism obtained in Equation 4.

It will be understood that the δ dispersion may vary widely according to the composition of a given material, and it should also be pointed out that the shape of the δ curve for a material of given composition will usually not remain substantially the same under all conditions. In general the individual values of δ defining the curve will be multiplied by a small factor with an increase either in the thickness or the degree of stretch in a given sheet of the material, which will thus produce partial rotation of the curve. This in turn means not only that the shape of the δ curve for a given combination of sheets may be controlled within limits by varying the thickness or degree of stretch in one or more of the component layers, but also that once the desired flat δ curve has been obtained with a combination of sheets, it may be raised or lowered to any desired final value by varying equally the thickness or degree of stretch in all the component layers.

From the facts in the preceding paragraphs, it will be seen that the invention is not limited to the selection of component sheets by trial and error, but that in general any two materials will combine to give an achromatic composite sheet provided sufficient thicknesses are employed. In computing the conditions of thickness or birefringence for the mate to a given single sheet, it is desirable to use the following modification of Equation 1:

$$N = \frac{N_1 N_2 (\Gamma_1 \pm \Gamma_2)}{N_2 \cdot \Gamma_1 \pm N_1 \cdot \Gamma_2} \qquad (9)$$

wherein $N_1$ and $N_2$ represent the N values, respectively, of the individual component sheets, and $\Gamma_1$ and $\Gamma_2$ represent the path differences in the two sheets for a given wavelength, which should preferably be near the middle of the portion of the spectrum for which achromatism is desired and in general may conveniently be the D line. Since however, the desired N for an achromatic combination has already been determined as −3.46, and since for a given birefringence Γ varies according to thickness, as appears in Equation 2, it will generally be preferable to substitute the corresponding values in equation (9) as follows:

$$\frac{N_1 N_2 (\Delta n_1 t_1 \pm \Delta n_2 t_2)}{N_2 (\Delta n_1 t_1) \pm N_1 (\Delta n_2 t_2)} = -3.46 \qquad (10)$$

The choice of whether the positive or negative signs are used in Equations 9 and 10 depends upon whether the vibration directions in the two component sheets are parallel or crossed.

In practicing the invention in accordance with the preceding paragraph, the first step may be to select a given sheet and a given material of known N value from which to prepare a second sheet for combination with the first. The known or measured values for $N_1$, $N_2$, $\Delta n_1$, $\Delta n_2$ and $t_1$ may then be substituted in Equation 10 and the equation solved for $t_2$, which will be the thickness of the second sheet necessary to give achromatism when combined with the first sheet. For preferred results, in selecting the second material the N value thereof should be a controlling factor, for two reasons. The first is that it is essential that the N values of the two materials be different, as is readily demonstrated by solving Equation 9 for the case wherein $N_2$ is equal to $N_1$ as follows:

$$N = \frac{N_1 N_1 (\Gamma_1 \pm \Gamma_2)}{N_1 \Gamma_1 \pm N_1 \Gamma_2} = N_1 \qquad (11)$$

or in words, when materials having the same dispersion of birefringence are combined, the dispersion of birefringence in the combination will equal the dispersion of birefringence in any of the component elements.

The second reason for considering carefully the N values in possible component sheets is that the thickness of the combination is to a large extent governed by the N values of its component layers, with the thinnest composite sheet being obtained when $N_1$ and $N_2$ are relatively widely different. There is also a further important factor in this connection. As has already been pointed out, in birefringent materials generally the absolute value of N is normally of the order of 20 or substantially higher, and N values of less than 20 may be considered as abnormal. In choosing materials for achromatic combination, therefore, it should be remembered that such combinations of the least thickness are obtained when the elements have relatively widely differing N values and when one of said elements is chosen from the class having abnormally low absolute values of N. It should be expressly understood, however, that this factor applies only to the thickness of the combination and is not to be construed as otherwise limiting the invention.

It will be apparent from the foregoing that under most conditions of practice of the invention, it is not essential that the complete δ dispersion be measured, and that satisfactory results may be obtained utilizing only the phase difference at the C, D and F lines, respectively. It follows that in practical use it will not be necessary to utilize in the apparatus shown in Fig. 2 a monochromator 25 covering all wavelengths of visible light, and that in place thereof there may be used in succession means such as three filters each passing individually only light of the C, D or F line.

Curve 45 in Fig. 3 represents the dispersion of δ in another type of birefringent material developed in accordance with the present invention, and more specifically a new and improved sensitive tint plate of markedly superior properties. As shown, curve 45 represents a δ dispersion ranging from approximately −120° at 400 mμ to upwards of 40° at 720 mμ, and crossing the line δ=0° at approximately 515 mμ. This means the sheet represented by curve 45 will be optically isotropic for light in the region of 515 mμ, positively birefringent for light of longer wavelength and negatively birefringent for light of shorter wavelength. Such a sheet has an important advantage when used as a sensitive tint plate in that the interference color is relatively insensitive to changes in the thickness or degree of stretch of the sheet, provided such changes are equal for all components thereof. The reason for this fact is easily understood. As already pointed out, the result of an increase in thickness or degree of stretch is to multiply δ by a small factor. Since, however, curve 45 crosses the δ=0 line, multiplication of δ by any constant factor will simply cause rotation of the curve about the point at which it crosses said line, and the material will remain isotropic for light of the wavelength at which said crossing occurs but will increase its retardation for light of other wavelengths.

The specific example of sensitive tint plate illustrated by curve 45 comprises a combination of two sheets having individual δ dispersion curves 46 and 48. The composite sheet represented by curve 46 comprises cellulose acetate approximately 0.010 inch in thickness which has been stretched to orient its molecules in the direction indicated by arrow 15 in Fig. 1 to such an extent that the sheet is biaxial with the angle between the axes within the sheet being of the order of 68°. The sheet represented by curve 48 comprises cellulose nitrate which has been stretched substantially 1.8 times its original length in the isotropic state and of a final thickness of approximately 0.0075 inch. Said sheets are of opposite signs of birefringence, as is shown by the negative values for δ defining curve 48, and they are accordingly assembled with their directions of stretch parallel, as indicated by arrow 15 in Fig. 1, in which case their slow vibration directions will be crossed, as indicated by arrows 15 and 16.

Composite sensitive tint plates of the above type may readily be made in the same manner as the achromatic composite sheets described above. Furthermore, they may be so controlled as to provide the zero retardation point at any desired region of the spectrum. For example, if it is desired to make such a composite sheet having zero retardation at 550 mμ, the first step will be to select any birefringent sheet as one component of the combination and measure its phase difference at 550 mμ. The next step is to select any other material of known or measured birefringence at 550 mμ, substitute the known or predetermined values in Equation 2 and solve for t, which in this case will be the thickness of a sheet of the second material imparting the same phase difference at 550 mμ. If the two materials are of the same sign of birefringence, they should be assembled with their directions of molecular orientation crossed, and vice versa if they are of opposite signs of birefringence.

It is not essential that the sensitive tint plates of the invention comprise a plurality of sheets. On the contrary, such devices may be produced in a simple layer. For example, curve 50 in Fig. 3 represents the δ dispersion of a sheet of cellulose nitrate which has been stretched to approximately 1.3 times its original length and having a final thickness of approximately 0.0055 inch. Furthermore, such a single sheet possesses a further advantage over the above composite sensitive tint sheets in that its interference color appears to be substantially insensitive to the angle of incidence. Other examples of single sheets having similar properties may be found by inspection of different sample sheets, but it will usually be found simpler and more satisfactory to construct a composite sheet as explained above. It should be noted in this connection that sheets, either single or composite, having such properties are found to have abnormally low N values, with the extreme case being a sheet having zero retardation at the D line and therefore having its N value also equal to zero.

Although in each of the foregoing examples the final composite sheet comprises only two component layers, it should be expressly understood that the invention is not limited to this construction. On the contrary, any desired number of layers may be used in precisely the manner described above, provided that they are assembled in pairs. In other words, for example, in Fig. 1 sheet 14 may comprise two component layers chosen and assembled in accordance with Equation 9 to have a value $N_2$ which may again be substituted in Equation 9 to combine with the corresponding value $N_1$ of sheet 12 and give the desired value N for the complete sheet 10. It will be readily apparent that this sequence of operations is capable of virtually infinite repetition within the scope of the invention.

It should be pointed out that the above described apparatus and method is not limited to the measurement of birefringence within the visible spectrum. On the contrary, the same method may be practiced for light outside the visible spectrum by simply modifying the apparatus shown in Fig. 2 to the extent of substituting a suitable photosensitive device for the eye 24 of the observer. Furthermore, the above equations may be applied to the computation of the desired optical properties for any wavelength band and are not limited to the entire range of visible light. The use of measurements at the C, D and F lines is convenient when dealing with visible light, but any wavelengths correspondingly situated near the extremes and middle of the band in question may be similarly used.

The measuring apparatus illustrated in Fig. 2 is also useful in connection with the preparation of birefringent material giving a predetermined retardation or phase difference, in which case the use of the apparatus is approximately the reverse of that already described. For example, if it is desired to form a plastic sheet wherein the phase difference is 135° for light of the D line, the first step could be to cast or otherwise prepare a sheet of a transparent plastic, such as polyvinyl alcohol or a cellulose ester, which may be isotropic or of low birefringence. The next step will be to rotate analyzer 32 in Fig. 2 from its zero position through 67½° and to set monochromator 25 for light of the D line. Next the above sheet may be placed in the position of element 33 in Fig. 2 and subjected to uniform stretch in a direction making angles of 45° with the polarizing axes of polarizers 28 and 30 until the two fields defined by said pair of polarizers are balanced. It will be seen that in accordance with Equation 7 the phase difference in the stretched sheet will then be equal to the desired value of 135°. Other similarly modified uses of the measuring method and apparatus of the invention will doubtless be apparent to those skilled in the art and are to be construed as coming within the scope hereof.

It has already been pointed out that the values of N may vary widely in materials of different composition. It should also be understood that the same may be true in the case of materials comprising the same components in different proportions. Furthermore, the tendency is for N to fluctuate so rapidly when a material of given N is desired, that it may prove more practical to measure a variety of samples and choose the one nearest the desired characteristics than to predict or predetermine the desired composition. For example, commercial Cellophane or regenerated cellulose has been found to have an average N value of the order of 115, but the N value for cellulose acetate is quite different and changes rapidly for different percentages of combined acetic acid. Measurements of a number of commercially available samples showed average N values of −33 for 53.1% acetic acid, −7.75 for 56.3%, and 4.5 for 62.5%, the triacetate. Similar variations are to be expected in similar series of compounds and can readily be handled in accordance with the principles of the invention.

It should also be noted that the apparatus illustrated in Fig. 2 is not limited to the specific arrangement of elements there shown and that modifications thereof may be utilized to produce equivalent results within the scope of the invention. For example, it is not essential that monochromator 25 be positioned as indicated in Fig. 2, but it may be placed at any other desired point in the system. As another example, it is not essential that birefringent sample 33 be imposed between polarizer 26 and both of polarizers 28 and 30. Instead, it may cover only one of polarizers 28 and 30, for example polarizer 30, in which case the intensity ratio between the two fields defined by polarizers 28 and 30 when the system is in balance will be $$\tan^2 \delta = \frac{b^2}{a^2+b^2} \qquad (10)$$

from which the values corresponding to Equations 6 and 7 above can readily be derived. This embodiment of the invention, however, is under some circumstances less advantageous than the embodiment first described, in that when the birefringent sheet covers both polarizers 28 and 30 the measurements will be independent of any non-birefringent absorption or absorbing agent within the sheet. It will also be apparent that the above described apparatus and method of making is not necessarily limited to the use of linear polarized light although the latter is preferred. Elliptically polarized light or elliptically polarizing elements may be used providing its degree of ellipticity is known and is compensated for in the subsequent calculations.

Since certain changes in the products which embody the invention may be made without departing from its scope, it is intended that all matter contained in the above description, or shown in the accompanying drawings, shall be interpreted as illustrative and not in a limiting sense.

What is claimed is:

1. As a new article of manufacture, a birefringent sheet material comprising molecularly oriented light transmitting, solid, organic plastic material, said sheet imparting a predetermined difference in phase to the two components of polarized light of a predetermined wavelength transmitted thereby, the dispersion (N) of birefringence within said material for visible light having an absolute value substantially less than 20 as determined by the equation $$N = \frac{\Gamma(D)}{\Gamma(F) - \Gamma(C)}$$

wherein $\Gamma(D)$ is the path difference between said components in said sheet for light of the D line of the spectrum, and $\Gamma(F)$ and $\Gamma(C)$ are similar values for the F and C lines of the spectrum, respectively, said sheet comprising a pair of individually birefringent, superimposed, stretched sheets of molecularly oriented transparent, solid, organic plastic material, the birefringence of each said sheet deriving essentially from the stretch imparted thereto, the dispersion of birefringence of each said sheet differing from that of the other said sheet, said pair of superimposed sheets comprising a first birefringent element and a second birefringent element, each comprising different material and positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements, respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

2. As a new article of manufacture, a birefringent sheet material comprising molecularly oriented light transmitting, solid, organic plastic material, said sheet imparting a predetermined difference in phase to the two components of polarized light of a predetermined wavelength transmitted thereby, the dispersion (N) of birefringence within said material for visible light having an absolute value substantially less than 20 as determined by the equation $$N=\frac{\Gamma(D)}{\Gamma(F)-\Gamma(C)}$$

wherein $\Gamma(D)$ is the path difference between said components in said sheet for light of the D line of the spectrum, and $\Gamma(F)$ and $\Gamma(C)$ are similar values for the F and C lines of the spectrum, respectively, said sheet comprising a pair of individually birefringent, superimposed, stretched sheets of molecularly oriented, transparent, solid, organic plastic material, the birefringence of each said sheet deriving essentially from the stretch imparted thereto, the dispersion of birefringence of each said sheet differing from that of the other said sheet, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N=\frac{N_1N_2(t_1\Delta n_1\pm t_2\Delta n_2)}{N_2(t_1\Delta n_1)\pm N_1(t_2\Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and — when the birefringent elements have opposite signs of birefringence, and $N_1$ and $N_2$ represent the dispersion (N) of birefringence in said first and second birefringent elements, respectively, as expressed by the formula $$N=\frac{\Gamma(D)}{\Gamma(F)-\Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, the dispersion of birefringence in one of said component sheets having an absolute value of substantially less than 20.

3. As a new article of manufacture, a birefringent sheet material comprising molecularly oriented light transmitting, solid, organic plastic material, said sheet imparting a predetermined difference in phase to the two components of polarized light of a predetermined wavelength transmitted thereby, the dispersion (N) of birefringence within said material for visible light having an absolute value substantially less than 20 as determined by the equation $$N=\frac{\Gamma(D)}{\Gamma(F)-\Gamma(C)}$$

wherein $\Gamma(D)$ is the path difference between said components in said sheet for light of the D line of the spectrum, and $\Gamma(F)$ and $\Gamma(C)$ are similar values for the F and C lines of the spectrum, respectively, said sheet comprising a pair of individually birefringent, superimposed, stretched sheets of molecularly oriented, transparent, solid, organic plastic material, the birefringence of each said sheet deriving essentially from the stretch imparted thereto, the dispersion of birefringence of each said sheet differing from that of the other said sheet, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N=\frac{N_1N_2(t_1\Delta n_1\pm t_2\Delta n_2)}{N_2(t_1\Delta n_1)\pm N_1(t_2\Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and — when the birefringent elements have opposite signs of birefringence, and $N_1$ and $N_2$ represent the dispersion (N) of birefringence in said first and second birefringent elements, respectively, as expressed by the formula $$N=\frac{\Gamma(D)}{\Gamma(F)-\Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, the dispersion of birefringence in one of said component sheets having an absolute value of substantially less than 20, the dispersion of birefringence in the other of said component sheets having an absolute value of substantially more than 20.

4. As a new article of manufacture, a birefringent sheet material comprising molecularly oriented light transmitting, solid, organic plastic material, said sheet imparting a predetermined difference in phase to the two components of polarized light of a predetermined wavelength transmitted thereby, the dispersion (N) of birefringence within said sheet for visible light being of the order of —3.46 as determined by the equation $$N=\frac{\Gamma(D)}{\Gamma(F)-\Gamma(C)}$$

wherein $\Gamma(D)$ is the path difference between said components in said sheet for light of the D line of the spectrum, and $\Gamma(F)$ and $\Gamma(C)$ are similar values for the F and C lines of the spectrum, respectively, said sheet comprising a pair of individually birefringent, superimposed, stretched sheets of molecularly oriented, transparent, solid, organic plastic material, the birefringence of each said sheet deriving essentially from the stretch imparted thereto, the dispersion of birefringence of each said sheet differing from that of the other said sheet, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N=\frac{N_1N_2(t_1\Delta n_1\pm t_2\Delta n_2)}{N_2(t_1\Delta n_1)\pm N_1(t_2\Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and $-$ when the birefringent elements have opposite signs of birefringence, and $N_1$ and $N_2$ represent the dispersion (N) of birefringence in said first and second birefringent elements, respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, the dispersion of birefringence in one of said component sheets having an absolute value of substantially less than 20.

5. As a new article of manufacture, a birefringent sheet material comprising molecularly oriented light transmitting, solid, organic plastic material, said sheet imparting a predetermined difference in phase to the two components of polarized light of a predetermined wavelength transmitted thereby, the dispersion (N) of birefringence within said sheet for visible light being of the order of $-3.46$ as determined by the equation $$N = \frac{\Gamma(D)}{\Gamma(F) - \Gamma(C)}$$

wherein $\Gamma(D)$ is the path difference between said components in said sheet for light of the D line of the spectrum, and $\Gamma(F)$ and $\Gamma(C)$ are similar values for the F and C lines of the spectrum, respectively, said sheet comprising a pair of individually birefringent, superimposed, stretched sheets of molecularly oriented, transparent, solid, organic plastic material, the birefringence of each said sheet deriving essentially from the stretch imparted thereto, the dispersion of birefringence of each said sheet differing from that of the other said sheet, said pair of superimposed sheets comprising a first birefringent element and a second birefringent element, each comprising different material and positioned in superimposed relation with their optic axes parallel, the dispersion (N) of birefringence in said combination of birefringent elements being of the order of $-3.46$ as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and $-$ when the birefringent elements have opposite signs of birefringence, and $N_1$ and $N_2$ represent the dispersion (N) of birefringence in said first and second birefringent elements, respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, the dispersion of birefringence in one of said component sheets having an absolute value of substantially less than 20, the dispersion of birefringence in the other of said component sheets having an absolute value of substantially more than 20.

6. As a new article of manufacture, birefringent sheet material imparting substantially the same predetermined phase difference to the two components of polarized light of a predetermined wavelength band transmitted thereby, said material comprising a plurality of different sheets of molecularly oriented, transparent, solid, organic plastic material arranged in superimposed relation with the vibration directions therein at predetermined angles with respect to each other, each of said component sheets being birefringent and imparting different phase differences throughout said predetermined wavelength band, the birefringence of each said sheet deriving essentially from its molecular orientation, the sum of the phase differences imparted by each of said component sheets being substantially constant throughout said predetermined wave length band, any preselected one of said sheets and its immediately adjacent superimposed sheet being a birefringent means comprising a first birefringent element and a second birefringent element, each comprising different material and positioned in superimposed relation with their optic axes parallel, the dispersion (N) of birefringence in said combination of birefringent elements being of the order of $-3.46$ as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and $-$ when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

7. As a new article of manufacture, birefringent sheet material imparting substantially the same phase difference to the two components of polarized light transmitted thereby substantially throughout the visible spectrum, said material comprising a plurality of different sheets of molecularly oriented, transparent, solid, organic plastic material arranged in superimposed relation with the vibration directions therein at predetermined angles with respect to each other, each of said component sheets being birefringent and imparting different phase differences throughout the visible spectrum, the birefringence of each said sheet deriving essentially from its molecular orientation, the sum of the phase differences imparted by each of said component sheets being substantially constant substantially throughout the visible spectrum, any preselected one of said sheets and its immediately adjacent superimposed sheet being a birefringent means comprising a first birefringent element and a second birefringent element, each comprising different material and positioned in superimposed relation with their optic axes parallel, the dispersion (N) of birefrigence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

8. As a new article of manufacture, birefringent sheet material imparting substantially the same predetermined phase difference to the two components of polarized light of a predetermined wavelength band transmitted thereby, said material comprising a plurality of different sheets of molecularly oriented, transparent, solid, organic plastic material arranged in superimposed relation with the vibration directions therein substantially parallel, each of said component sheets being birefringent and imparting different phase differences throughout said predetermined wavelength band, the birefringence of each said sheet deriving essentially from its bimolecular orientation, the sum of the phase differences imparted by each of said component sheets being substantially constant throughout said predetermined wavelength band, any preselected one of said sheets and its immediately adjacent superimposed sheet being a birefringent means comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefrigent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

9. As a new article of manufacture, birefringent sheet material imparting substantially the same predetermined phase difference to the two components of polarized light of a predetermined wave length band transmitted thereby, said material comprising a plurality of different sheets of molecularly oriented, transparent, solid, organic plastic material arranged in superimposed relation with the vibration directions therein substantially crossed, each of said component sheets being birefringent and imparting different phase differences throughout said predetermined wavelength band, the birefringence of each said sheet deriving essentially from its molecular orientation, the sum of the phase differences imparted by each of said component sheets being substantially constant throughout said predetermined wavelength band, any preselected one of said sheets and its immediately adjacent superimposed sheet being a birefringent means comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

10. As a new article of manufacture, a birefringent sheet material comprising molecularly oriented, light transmitting, plastic material, said sheet being positively birefringent for light of one region of the spectrum, negatively birefringent for light of another region of the spectrum, and isotropic for light of at least one wavelength substantially intermediate said first-named spectral regions, said sheet comprising a pair of superimposed sheets of transparent, individually birefringent, molecularly oriented, solid, stretched, organic plastic material, the birefringence of each said sheet deriving essentially from the stretch imparted thereto, said sheets being so chosen and combined that the phase difference in one thereof for light of said intermediate wavelength is substantially equal and opposite in sign to the phase difference in the other thereof for said light of said intermediate wavelength, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

11. As a new article of manufacture, a birefringent sheet material comprising molecularly oriented, light transmitting, plastic material, said sheet being positively birefringent for light of one region of the spectrum, negatively birefringent for light of another region of the spectrum, and isotropic for light of at least one wavelength substantially intermediate said first-named spectral regions, said sheet comprising a pair of superimposed sheets of transparent, individually birefringent, molecularly oriented, solid, stretched, organic plastic material, the birefringence of each said sheet deriving essentially from the stretch imparted thereto, said composite sheets being of the same sign of birefringence and being arranged with their respective directions of molecular orientation substantially crossed, the retardation in each of said composite sheets for light of said intermediate wavelength being substantially equal, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum, and $\Gamma(F)$ and $\Gamma(C)$ represent similar values for the F and C lines of the spectrum, respectively, $N_1$ being substantially different from $N_2$.

12. As a new article of manufacture, a birefringent sheet material comprising molecularly oriented, light transmitting, plastic material, said sheet being positively birefringent for light of one region of the spectrum, negatively birefringent for light of another region of the spectrum, and isotropic for light of at least one wavelength substantially intermediate said first-named spectral regions, said sheet comprising a pair of superimposed sheets of transparent, individually birefringent, molecularly oriented, solid, stretched, organic plastic material, the birefrigence of each said sheet deriving essentially from the stetch imparted thereto, said composite sheets being of opposite signs of birefringence and being arranged with their respective directions of molecular orientation substantially parallel, the retardation in each of said composite sheets for light of said intermediate wavelength being substantially equal, said pair of superimposed sheets comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and — when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

13. As a new article of manufacture, sensitive tint material comprising, in combination, a pair of superimposed sheets of transparent, individually birefringent, molecularly oriented, solid, stretched, organic plastic material, the birefringence of each said sheet deriving essentially from the stetch imparted thereto, the phase differences in said sheets for light of a predetermined wavelength being equal, the phase difference in one of said sheets for light of another predetermined wavelength greater than said first-named wavelength being greater than in the other of said sheets and for a third wavelength less than said first-named being less than in the other of said sheets, said sheets being arranged with the corresponding vibration directions therein substantially at right angles to each other, said pair of superimposed sheets comprising a first birefringent element and a second birefringent element, each comprising different material and positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$.

14. As a new article of manufacture, a birefringent sheet material comprising molecularly oriented light transmitting plastic material, said sheet comprising a pair of superimposed sheets of molecularly oriented, stretched, transparent, solid, organic plastic material, said pair of superimposed sheets comprising a first birefringent element and a second birefringent element, the birefringence of said elements differing and deriving essentially from the stretch imparted thereto, said elements comprising different material and being positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference in said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to constitute an achromatic wave plate of predetermined phase difference over a predetermined region of the spectrum, at least one of said birefringent elements being a suitably oriented plastic material which has optical characteristics similar to a uniaxial birefringent crystal.

15. As a new article of manufacture, a birefringent sheet material comprising molecularly oriented light transmitting plastic material, said sheet comprising a pair of superimposed sheets of molecularly oriented, stretched, transparent, solid, organic plastic material, said pair of superimposed sheets comprising a first birefringent element and a second birefringent element, the birefringence of said elements differing and deriving essentially from the stretch imparted thereto, said elements comprising different material and being positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to constitute a wave plate having a predetermined substantially constant phase difference over a predetermined region of the spectrum, at least one of said birefringent elements being a suitably oriented plastic material which has optical characteristics similar to a uniaxial birefringent crystal.

16. As a new article of manufacture, a birefringent sheet material comprising molecularly oriented light transmitting plastic material, said sheet comprising a pair of superimposed sheets of molecularly oriented, stretched, transparent, solid, organic plastic material, said pair of superimposed sheets comprising a first birefringent element and a second birefringent element, the birefringence of said elements differing and deriving essentially from the stretch imparted thereto, said elements comprising different material and being positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to constitute a wave plate having a predetermined substantially constant phase difference over a predetermined region of the spectrum, at least one of said birefringent elements being a suitably oriented plastic cellulose acetate which has optical characteristics similar to a uniaxial birefringent crystal.

17. As a new article of manufacture, a birefringent sheet material comprising molecularly oriented light transmitting plastic material, said sheet comprising a pair of superimposed sheets of molecularly oriented, stretched, transparent, solid, organic plastic material, said pair of superimposed sheets comprising a first birefringent element and a second birefringent element, the birefringence of said elements differing and deriving essentially from the stretch imparted thereto, said elements comprising different material and being positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to constitute a wave plate having a predetermined substantially constant phase difference over a predetermined region of the spectrum, at least one of said birefringent elements being a suitably oriented plastic cellulose nitrate which has optical characteristics similar to a uniaxial birefringent crystal.

CUTLER D. WEST.

REFERENCES CITED

The following references are of record in the file of this patent:

UNITED STATES PATENTS

| Number | Name | Date |
| --- | --- | --- |
| 1,476,102 | Picard et al. | Dec. 4, 1923 |
| 1,926,716 | Ehringhaus | Sept. 12, 1933 |
| 2,184,999 | Land et al. | Dec. 26, 1939 |
| 2,237,565 | Land | Apr. 8, 1941 |
| 2,270,323 | Land et al. | Jan. 20, 1942 |
| 2,285,792 | Bailey | June 9, 1942 |
| 2,347,582 | Ulffers | Apr. 25, 1944 |

FOREIGN PATENTS

| Number | Country | Date |
| --- | --- | --- |
| 378,742 | Great Britain | Aug. 13, 1932 |
| 499,797 | Great Britain | Jan. 30, 1939 |

OTHER REFERENCES

McNally et al., Journal Physical Chem., vol. 34, Jan. June 1930, pages 165–172.

Wright, Text, Light, Pub. MacMillan & Co., New York 1892, pages 341, 342, 356.

Brewster, Text, A Treatise of Optics, Pub. Longman Brown Green and Longman, London 1852, pages 252, 253, 289, 290.

Johannsen, Manual of Petrographic Methods, 1918, McGraw Hill Book Co., Inc., 239 West 39th St., New York, pages 346–351, 369 to 373, 442–445 inc.

John Spence, Journal of Phy. Chemistry, vol. 43, Oct. 1, 1939, pages 865 to 879.

Farewell, Journal of Applied Physics, vol. 10, Feb. 1939, pages 109 to 113.